July 31, 1956   J. W. HILL   2,756,907
METERING MACHINE
Filed Oct. 23, 1952   2 Sheets-Sheet 1
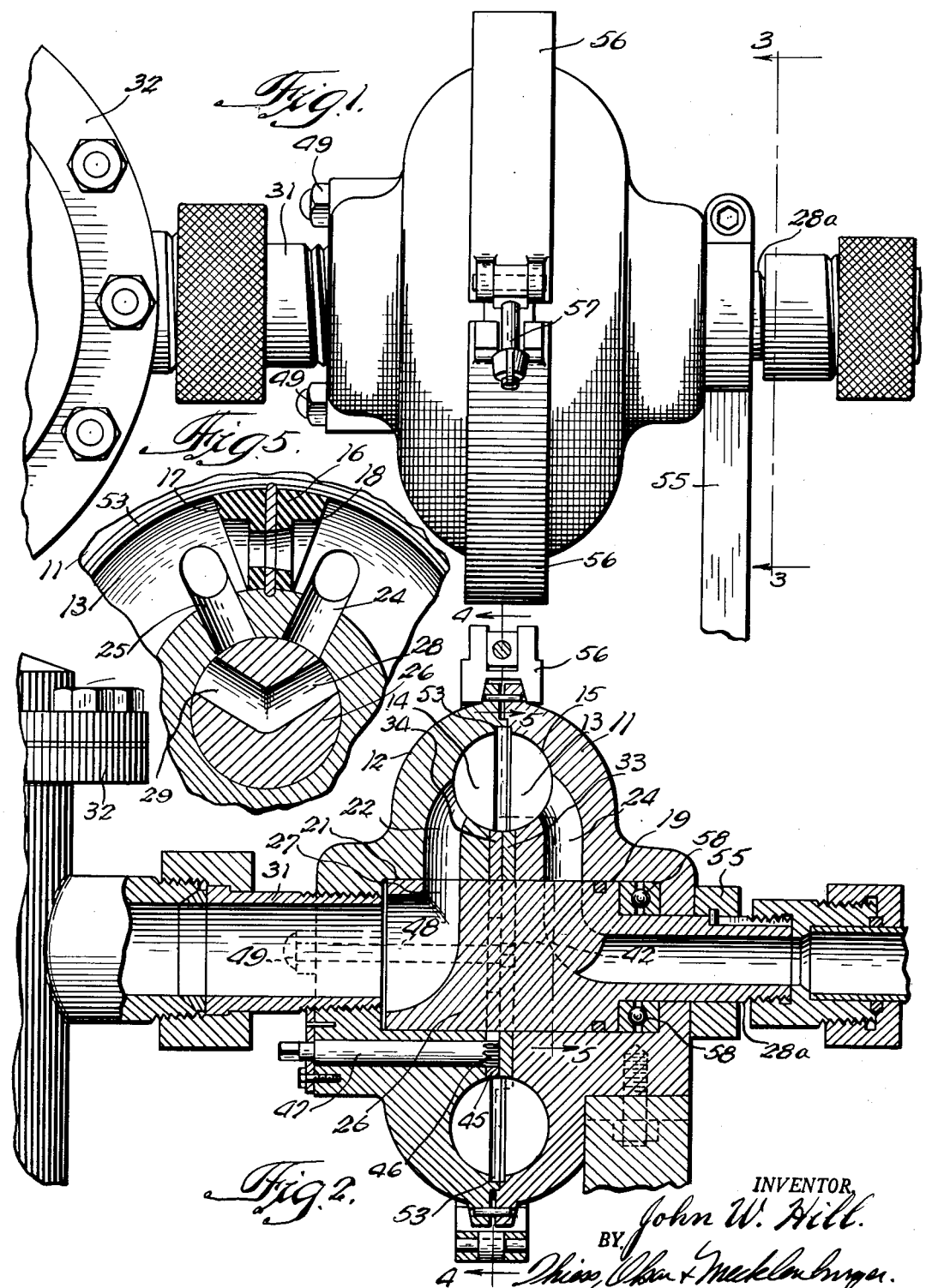
INVENTOR
John W. Hill
BY Thiess, Olsen & Mecklenburger
Attys.

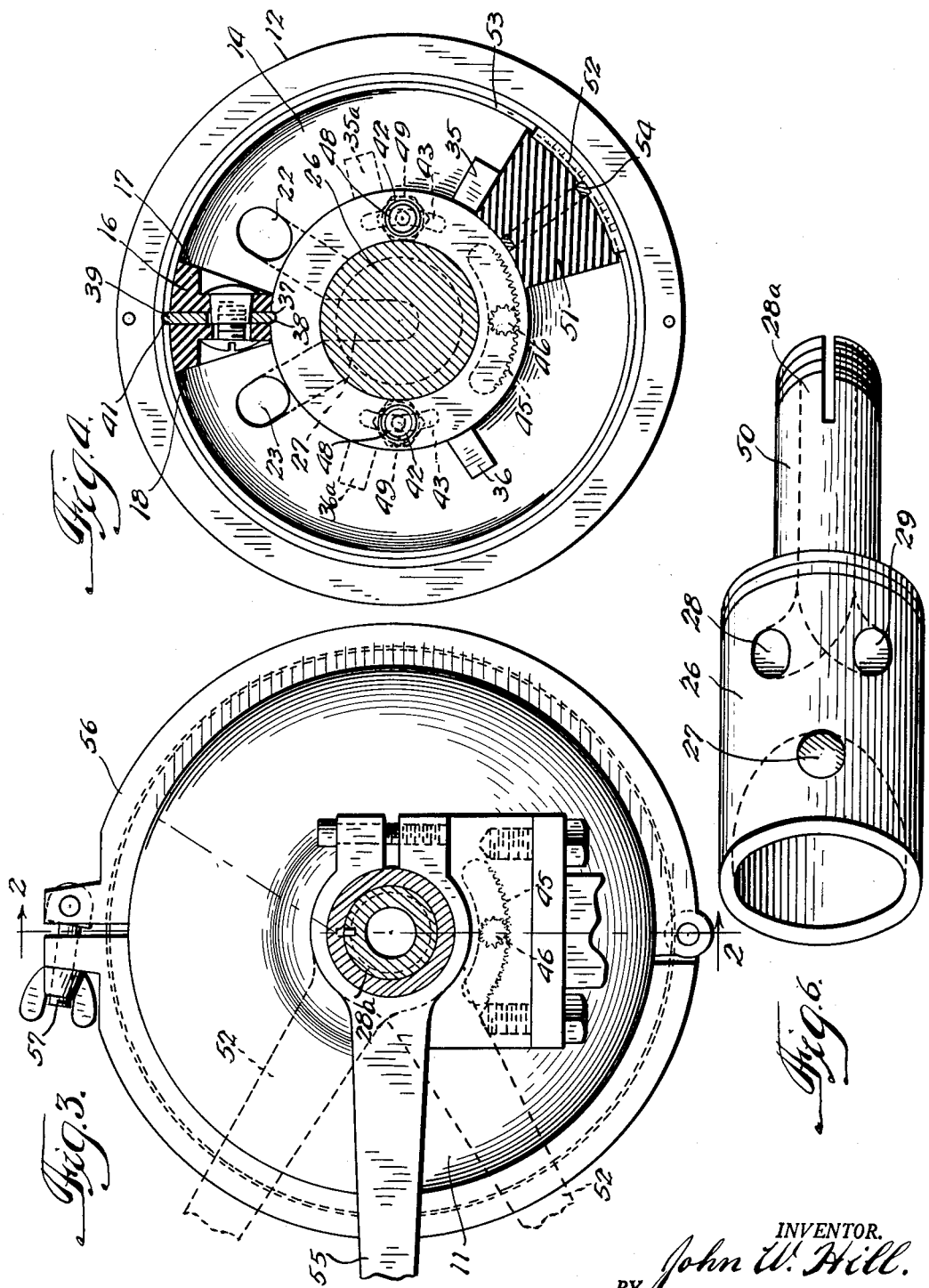

United States Patent Office 2,756,907
Patented July 31, 1956

2,756,907

METERING MACHINE

John W. Hill, Chicago, Ill., assignor to The Globe Company, Chicago, Ill., a corporation of Illinois Application October 23, 1952, Serial No. 316,449

16 Claims. (Cl. 222—250)

The present invention relates to a metering machine and has special reference to a machine for metering out consistently exact, predetermined charges of plastic or other flowable materials.

More particularly this invention relates to a metering machine for measuring and supplying exact charges of plastic or flowable materials, including food products such as sausage meat, lard, butter, cheese, ice cream, etc., to other machines for further operations. One such use may be in connection with filling machines for filling casings or other containers with the measured charges of material.

This application is a continuation-in-part of my copending application Serial No. 238,494, filed July 25, 1951, now abandoned.

It is very desirable that a metering machine be consistently accurate in measuring predetermined charges of material despite variations in the material being handled. Moreover, it is essential that machines used for handling food products be designed for easy and thorough cleaning.

The present metering machine may be very accurately adjusted to measure the exact amount of material desired. In fact, accurate adjustments may be made during operation of the machine. Accordingly, any change in the density or consistency of the material, as sometimes occurs, may be compensated for at once to insure that the charges measured shall be exact. This is of extreme importance where large amounts of material are to be measured and packed in small quantities. If the package is underweight it must be rejected, and if it is overweight a substantial loss will result.

Moreover, a metering machine embodying the present invention may be adjusted to measure and feed charges varying greatly in volume and weight. By employing machines of different capacities the amounts to be measured may be substantially as large or as small as desired.

While the present machine may be employed with a great variety of different plastic or other flowable materials, it is particularly suitable for handling food products, as it may be readily taken apart and thoroughly cleaned with a minimum of time and effort.

The material being handled is supplied to the metering machine under substantial pressure which will vary, depending upon the material to be measured and various other conditions, generally being within the range of 50 to 150 pounds per square inch or more.

In one embodiment, the present metering machine may include a substantially endless chamber, such as a hollow torus, with a fixed dam dividing it at one location. A floating piston may be arranged in the chamber for movement by the product pressure between two stop members adjustable relatively toward and away from each other to vary the distance between them and, accordingly, the amount to be metered out by the machine.

In order to prevent any wobbling, twisting or movement of the piston otherwise than longitudinally of the chamber, which might result in jamming or binding of the piston in the chamber, guide means are provided. These guide means may consist of a longitudinal fin or key on the outer side of the piston slidably positioned in a longitudinally extending circumferential slot in the outer wall of said chamber.

Inlet passages extend from a source of material under pressure to the chamber portions at each side of the fixed dam, and outlet passages extend from the chamber portions on each side of the dam to the discharge outlet or outlets. Suitable valve means is arranged to supply material alternately to each side of the dam while opening the discharge passageway on the opposite side of the dam. The material under pressure entering one inlet passage will move the piston away therefrom between the stop members, thus causing the predetermined charge to be forced through the open outlet passage to the discharge.

The machine preferably comprises two cooperating, substantially disk-shaped members or covers having mating annular grooves therein and central openings. The two disks are detachably secured together, and when in operative position, the mating grooves form an annular passage. With this construction the device may be completely and readily opened for thorough cleaning.

An object of the present invention is to provide a metering machine for accurately measuring and feeding charges of material.

Another object is to provide a metering machine which may be adjusted or altered to accurately measure relatively small or relatively large charges of material.

A further object is to provide such a machine which may be finely adjusted exteriorly of the machine and during operation thereof.

Still another object is to provide a metering machine which may be readily taken apart and thoroughly and quickly cleaned.

An additional object is to provide a metering machine having control valves so arranged that only a small amount of movement thereof is required for efficient operation.

Another object is to provide a metering machine which may be used with other equipment, such as a filling machine, for measuring and thereafter filling containers or carrying out other steps with respect to the measured material.

An additional object is to provide a metering machine which will work smoothly and easily without any binding or jamming of the parts thereof.

Still another object is to provide a compact metering machine of simple construction having few moving parts.

Further objects and advantages will be apparent from the following description and claims when considered with the drawings, in which:

Fig. 1 is a top plan view of a metering machine embodying the present invention;

Fig. 2 is a cross-sectional view of the metering machine taken on the line 2—2 of Fig. 3;

Fig. 3 is an end elevational view of the metering machine taken on the line 3—3 of Fig. 1;

Fig. 4 is a cross-sectional view of the metering machine taken on the line 4—4 of Fig. 2 with the clamping ring omitted;

Fig. 5 is a fragmentary cross-sectional view of the dam, passage and valve construction taken on the line 5—5 of Fig. 2; and Fig. 6 is a perspective view of one form of valve member that may be employed in the present machine.

Referring more particularly to the drawings, there is shown a metering machine embodying the present invention, comprising a pair of disks or cover plates 11 and 12 which form the casing or shell of the device. Instead of being circular, the cover plates may be of other shapes, if desired. However, the round shape illustrated results in a more compact device.

Formed in the opposed faces of the disks 11 and 12 are mating grooves 13 and 14, preferably semicircular in cross section, which, when the disks are in assembled position, form an annular or torus shaped chamber 15, as shown particularly in Figs. 2 and 4. A dam 16 is immovably positioned in the chamber 15. The resulting chamber is substantially continuous and, in the form illustrated, circular, but terminates at the faces 17 and 18 of the dam 16.

The dam 16 is preferably removable to facilitate cleaning of the device but may be formed integral with or as a part of one of the disks 11 and 12. Moreover, the dam may be of substantial thickness, although as its thickness is increased the capacity of the chamber is correspondingly reduced.

The cover plates 11 and 12 are provided with central apertures 19 and 21. The material under pressure is fed to and discharged from the machine through suitable mechanism arranged in the central openings. Formed in the cover or disk 12 are a pair of inlet passages 22 and 23 (Fig. 4). These passages are preferably radially arranged and extend from the central opening of the cover 12 outwardly and communicate with the portions of the chamber adjacent the opposite ends 17 and 18 of the dam 16. Discharge or outlet passages 24 and 25 are formed in the opposite cover or disk 11. As shown in Fig. 5, these passages are also preferably radially extending and connect the portions of the chamber adjacent each side of the dam 16 with the central opening 19 thereof.

Positioned in the central openings of the covers 11 and 12 is a valve member 26 illustrated particularly in Fig. 6. In the form of valve shown, the valve member 26 is provided with a passageway 27 arranged to communicate with the passageways 22 and 23 upon rotation of the valve and a pair of passageways 28 and 29 positioned to communicate with the passageways 24 and 25 in the cover 11. The passageways 28 and 29 lead into a discharge passageway 28a in the valve member 26. When the valve is in neutral position as shown in Figs. 4 and 5, the passageway 27 is intermediate the inner ends of the passageways 22 and 23, while the passageways 28 and 29 are outwardly of the passageways 24 and 25.

The various passageways 22, 23 and 24 in the covers 11 and 12 and 27, 28 and 29 in the valve member 26 are all preferably of substantially the same size. However, the size of these openings may be varied depending upon conditions of operation and it may be desirable to make them all of substantially the same size as the discharge passageway 28a.

The passageway 27 in the valve communicates with a source of material under pressure through a conduit 31. In the arrangement shown, the material under pressure is supplied from an ordinary meat stuffer 32, which normally maintains the material under pressure within a range of 50 to 400 pounds per square inch. The pressure maintained on the material being supplied to the metering machine may vary substantially from these figures, depending upon the material being treated and various other related factors.

A pair of stop rings 33 and 34 having a central opening for fitting about the valve member 26 are positioned between the cover members 11 and 12, with their peripheries forming part of the wall of the chamber 15, as shown in Fig. 2. These rings 33 and 34 are provided, respectively, with stop members 35 and 36 which project outwardly into the chamber 15. The rings are preferably arranged so that the stop members 35 and 36 are substantially the same distance from the dam 16, although this is not necessary. The ring 33 is fixed with respect to the covers 11 and 12. This may be accomplished by any suitable means, that being shown consisting of a notch 37 in the ring 33 which receives a projecting member 38 on the dam 16. The dam in turn may be held fixed in the casings 11 and 12 by a projecting portion 39 on the dam fitting into a notch 41 in one of the casing members or any other suitable means. Openings 42 are also formed in opposite sides of the stop ring 33. The second stop ring 34 carrying the stop member 36 is provided with a pair of arcuate slots 43 at opposite sides and an arcuate opening 44 at the bottom having a rack 45 at one edge thereof for meshing with a pinion 46 carried on a shaft 47 which projects outwardly through the casing 12. The outer end of the shaft 47 is shaped to receive a key or other operating tool for rotating the shaft. The rotation of the pinion 46 results in rotation of the ring 34 and moves the stops 35 and 36 relatively toward and away from each other.

Means are provided for preventing unintentional movement of the stop ring 34. This may consist of a pair of bolts 48 having their heads positioned in the openings 42 in the ring 33 and extending outwardly through the slots 43 in the ring 34 and the cover 12. A screw cap 49 is threaded on the outer end of the clamping bolt 48 which, when tightened, serves to prevent rotation of the ring 34.

A floating piston 51 is positioned in the chamber 15 intermediate the stops 35 and 36 so that its movement is limited by the stop members. These stops may be positioned at various locations about the rings 33 and 34 so that the space between them is relatively small, as shown in Fig. 4, or may be greater, as shown by the dotted line stops 35a and 36a, or may be adjacent the various passageways. As will be hereinafter pointed out, the measured charge may be controlled by selecting the proper rings for the machine. The greater the distance between the stops the greater the measured charge of the metering machine.

The piston 51 may be made of stainless steel or any other suitable material. As shown particularly in Fig. 4, it has the same longitudinal arc or curvature as the portion of the chamber 15 in which it reciprocates along the curvature thereof and the ends thereof are preferably in planes extending transversely substantially radially of the chamber 15. In order to guide the piston during its reciprocal movement in the chamber 15 to prevent any jamming or binding of the piston, it is provided with a longitudinal fin or key 52 which fits in a longitudinal slot 53 provided therefor in the walls of the chamber 15. The key 52 which may be made of metal or any other suitable material is preferably positioned on the outer side of the piston and the slot 53 in which it rides is formed in the outer side of the walls of the chamber 15. This slot may be formed by rabbeting or cutting out a portion of the meeting edges of the plates 11 and 12 at the outer sides of the grooves 13 and 14, as illustrated in Fig. 5. An O ring 54 of suitable material, such as rubber or neoprene is preferably positioned about the piston 51 in a suitable groove to prevent the passage of any material past the piston while permitting it to slide freely in the chamber 15.

With the metering machine connected to a meat stuffer or other source of material under pressure, nothing will occur while the valve is in neutral position. Operation of the machine is controlled by movement of the handle 55 keyed to the outwardly projecting reduced portion 50 of the valve member 26. If the handle 55 is moved downwardly from the neutral full-line position shown in Fig. 3, the valve member 26 will be rotated to bring the passageway 27 into communication with the inlet passageway 23, and the passageway 28 will be in communication with the outlet passageway 24. Material under pressure entering the chamber 15 through the inlet 23 will move the free piston 51 against the stop 35 as shown in Fig. 4. When the valve member is then rotated or rocked in the opposite direction by raising the handle 55, it passes through neutral position to its other operating position with the passageway 27 communicating with the inlet 22 and the passageway 29 communicating with the outlet 25. The material under pressure entering the chamber through the inlet 22 will then move the piston 51 to the left as shown in Fig. 4, and an amount of material displaced by movement of the piston 51 will be discharged from the chamber through the outlet 24. By reciprocating or rocking the valve member 26 between its two operative positions, a rotation of about 60°, the metering machine will discharge consistently exact charges of material at a rate dependent upon the rate of reciprocation of the handle 52.

The material received in the discharge openings 28 and 29 flows through the discharge passage 28a in the valve member 26.

As changes in the consistency or density of the material being metered may occur, the weight of a measured volume of material may sometimes vary. When this occurs the machine may be readily adjusted so that the weight of each charge will be consistently exact. It is merely necessary to loosen the cap nuts 49 and rotate the shaft 47 and pinion 46, thus altering the distance of the stop 36 from the stop 35. This may be done while the machine is in operation.

The valve handle 55 for rocking the valve member 26 back and forth may be operated manually or may be operated automatically in timed sequence.

Moreover, the metering machine of the present invention may be used independently as a measuring device for the manual filling of casings or other containers. However, it is particularly suitable for use with other machines for performing additional operations on the measured charges of material. It may be connected to the inlet side of a filling machine which will place the individual charges in casings or other containers automatically. When so used control means are usually employed to effect operation of the machines in desired timed relation.

The present metering machine is held in assembled position by a clamping ring 56 which fits over the peripheries of the cover plates 11 and 12. The ends of the ring 56 may be adjustably locked together by any suitable means, such as a screw clamp 57. To disassemble the device for cleaning it is merely necessary to remove the clamping ring 56 and separate the two disks or covers 11 and 12. Thereafter the valve member 26 may be removed as well as the dam 16 and the piston 51. Also, the stop rings 34 may be removed from the valve member. Thus, all portions of the device may be easily and quickly reached for thorough cleaning.

It has been found desirable in order to facilitate rotation of the valve, despite the pressure of the material thereagainst, to employ ball bearings 58 between the valve member 19 and the adjacent side of the casing 11.

The machine, particularly when automatically controlled, may be operated at high speed to meter out exact charges of material consistently, as it may be readily adjusted to compensate for any variation in the material being handled.

While particular embodiments of this invention have been illustrated and described, it will be understood of course that the invention is not to be limited thereto since many modifications may be made, and it is contemplated therefore by the appended claims to cover any such modifications as fall within the true spirit and scope of this invention.

I claim:

1. A metering machine comprising a casing having therein a substantially annular chamber of substantially uniform cross section with a fixed dam therein dividing it at one part, a pair of spaced stop members in said chamber, a movable piston positioned intermediate said members and limited in movement thereby, said stop members being relatively adjustable toward and away from each other, and control means arranged interiorly of said chamber for effecting relative adjustment of said stop members.

2. A metering machine comprising a pair of cooperating substantially discoid members with central openings therein, said members having mating substantially annular grooves forming a substantially annular chamber, a fixed dam forming opposite ends of said chamber, a pair of spaced stop members extending outwardly into said chamber from the inner side thereof, a free floating movable piston positioned intermediate said stop members and limited in movement thereby, said stop members being relatively adjustable toward and away from each other, and exteriorly operable adjusting means for varying the distance between said stop members.

3. A metering machine comprising a pair of cooperating substantially discoid members with central openings therein, said members having mating substantially annular grooves forming a substantially annular chamber, a fixed dam forming opposite ends of said chamber, a pair of substantially flat parallel relatively rotatable rings having substantially radially extending stop portions on the peripheries thereof mounted about said central opening and defining the inner portion of said chamber with said stop portions projecting outwardly into said chamber, and a movable piston positioned intermediate said stop members and limited in movement thereby.

4. A metering machine comprising a pair of cooperating substantially discoid members with central openings therein, said members having mating substantially annular grooves forming a substantially annular chamber, a fixed dam forming opposite ends of said chamber, a pair of substantially flat parallel relatively rotatable rings having substantially radially extending stop portions on the peripheries thereof mounted about said central opening and defining the inner portion of said chamber with said stop portions projecting outwardly into said chamber, a movable piston positioned intermediate said stop members and limited in movement thereby, and exteriorly operable adjusting means for effecting relative rotation of said rings.

5. A metering machine comprising a pair of cooperating substantially discoid members with central apertures therein forming a central opening, said members having mating substantially annular grooves forming a substantially annular chamber, a fixed dam forming opposite ends of said chamber, said discoid members having a pair of inlet passages extending from the chamber portions adjacent each side of said dam inwardly to said central opening and a pair of outlet passages extending from said chamber portions inwardly to said central opening, and valve means positioned in said central opening for connecting said inlet passages to a source of material under pressure and said outlet passages to a discharge.

6. A metering machine comprising cooperating plate members with central apertures therein for forming a casing, said members having mating grooves forming a substantially annular chamber, a fixed dam forming opposite ends of said chamber, said casing having a pair of inlet passages extending from the chamber portions adjacent each side of said dam inwardly to said central opening and a pair of outlet passages extending from said chamber portions inwardly to said central opening, and valve means having an inlet port at one side and a discharge port at the other positioned in said central opening for connecting said inlet passages to a source of material under pressure and said outlet passages to a discharge, said valve being arranged to receive said material through the central aperture in one of said discoid members and to discharge it through the central aperture in the other discoid member.

7. A metering machine comprising a pair of cooperating substantially discoid members with central apertures therein forming a central opening, said members having mating substantially annular grooves forming a substantially annular chamber, a fixed dam forming opposite ends of said chamber, said casing having a pair of inlet passages extending from the chamber portions adjacent each side of said dam inwardly to said central opening and a pair of outlet passages extending from said chamber portions inwardly to said central opening, and valve means positioned in said central opening for connecting either of said inlet passages to a source of material under pressure and the outlet passage on the opposite side of said dam to a discharge.

8. A metering machine comprising a pair of cooperating substantially discoid members with central apertures therein forming a central opening having mating substantially annular grooves forming a substantially annular chamber, a fixed dam forming opposite ends of said chamber, said discoid members having a pair of inlet passages extending from the chamber portions adjacent each side of said dam inwardly to said central opening and a pair of outlet passages extending from said chamber portions inwardly to said central opening, and valve means in said central opening for alternately connecting said inlet passages to a source of material under pressure and the outlet passages on the opposite side of said dam to discharge means.

9. A metering machine for connection to a source of flowable material under pressure comprising a casing having an elongated arcuate chamber defining the major portion of a circle and of substantially uniform cross section throughout at least most of its length, a pair of stop members in said chamber spaced from the ends thereof and from each other and relatively adjustable toward and away from each other, a free floating piston in said chamber intermediate the stop members therein and limited in movement thereby, and means including a valve located at the center of curvature of said chamber for connecting said source of material under pressure alternately to opposite ends of said chamber and simultaneously connecting the far end of said chamber to a discharge.

10. A metering machine for connection to a source of flowable material under pressure comprising a casing having an elongated arcuate chamber defining the major portion of a circle and of substantially uniform cross section throughout at least most of its length, a pair of stop members in said chamber spaced from the ends thereof and from each other and relatively adjustable toward and away from each other, a free floating piston in said chamber intermediate the stop members therein and limited in movement thereby, and means including a valve adjacent the center of curvature of said chamber for connecting said source of material under pressure alternately to opposite ends of said chamber and simultaneously connecting the far end of said chamber to a discharge to force said piston back and forth between said stop members.

11. A metering machine for connection to a source of flowable material under pressure comprising a casing having an elongated arcuate chamber defining the major portion of a circle and of substantially uniform cross section throughout at least most of its length, a pair of stop members projecting radially into said chamber spaced from the ends thereof and from each other and relatively adjustable toward and away from each other, a free floating piston in said chamber intermediate the stop members therein and limited in movement thereby, and valve means adjacent the center of curvature of said chamber for connecting said source of material under pressure alternately to opposite ends of said chamber and simultaneously connecting the far end of said chamber to a discharge to force said piston back and forth between said stop members.

12. A metering machine for connection to a source of flowable material under pressure comprising a casing having an elongated arcuate chamber defining the major portion of a circle and of substantially uniform cross section throughout at least most of its length, a pair of stop members in said chamber spaced from the ends thereof and from each other, a free floating piston in said chamber intermediate the stop members therein and limited in movement thereby, said piston and chamber having cooperating guiding means extending along the curvature of said chamber for maintaining said piston in proper alignment with said chamber.

13. A metering machine for connection to a source of flowable material under pressure comprising a casing having an elongated arcuate chamber defining the major portion of a circle and of substantially uniform cross section throughout at least most of its length, a pair of stop members in said chamber spaced from the ends thereof and from each other, a free floating piston in said chamber intermediate the stop members therein and limited in movement thereby, said chamber having a circumferential slot extending along the curvature of said chamber in the outer side thereof, and said piston having a key on the outer side thereof positioned in said slot for maintaining said piston in proper alignment with said chamber.

14. A metering machine for connection to a source of flowable material under pressure comprising a casing having an elongated arcuate chamber defining the major portion of a circle and of substantially uniform cross section throughout at least most of its length, a pair of stop members in said chamber spaced from the ends thereof and from each other, a free floating piston in said chamber intermediate the stop members therein and limited in movement thereby, said casing having a central opening inwardly of said arcuate chamber and inlet and outlet passages extending from the chamber portions adjacent each end thereof inwardly to said central opening, and valve means positioned in said central opening for connection to said source of material under pressure and having a discharge port therein, said valve being arranged to alternately connect said inlet passages to said source of material and said outlet passages to said discharge port.

15. A metering machine for connection to a source of flowable material under pressure comprising a casing having an elongated arcuate chamber defining the major portion of a circle and of substantially uniform cross section throughout at least most of its length, a pair of stop members in said chamber spaced from the ends thereof and from each other, a free floating piston in said chamber intermediate the stop members therein and limited in movement thereby, said casing having a central opening inwardly of said arcuate chamber and a pair of inlet and a pair of outlet passages extending from the chamber portions adjacent each end thereof inwardly to said central opening, and valve means positioned in said central opening for connection to said source of material under pressure and having a discharge port therein, said valve being arranged to alternately connect said inlet passages to said source of material and said outlet passages to said discharge port.

16. A metering machine for connection to a source of flowable material under pressure comprising a casing having an elongated arcuate chamber defining the major portion of a circle and of substantially uniform cross section throughout at least most of its length, a pair of stop members in said chamber spaced from the ends thereof and from each other, a free floating piston in said chamber intermediate the stop members therein and limited in movement thereby, said casing having a central opening inwardly of said arcuate chamber, a pair of inlet and a pair of outlet passages extending from the chamber portions adjacent each end thereof inwardly to said central opening, and cylindrical valve means positioned in said central opening having an inlet port at one end for connection to said source of material under pressure and having a discharge port at the other end, said valve being arranged to alternately connect said inlet passages to said source of material and said outlet passages to said discharge port.

References Cited in the file of this patent

UNITED STATES PATENTS

| | | |
|---|---|---|
| 312,872 | Lord | Feb. 24, 1885 |
| 572,782 | Williams | Dec. 8, 1896 |
| 1,937,495 | Mitchell | Nov. 28, 1933 |
| 2,062,181 | Klaus | Nov. 24, 1936 |
| 2,620,960 | Harrington | Dec. 9, 1952 |
| 2,673,012 | Harrington | Mar. 23, 1954 |

FOREIGN PATENTS

| | | |
|---|---|---|
| 4,498 | Great Britain | Sept. 20, 1883 |